US006695128B2

(12) United States Patent
Palmaer et al.

(10) Patent No.: US 6,695,128 B2
(45) Date of Patent: Feb. 24, 2004

(54) STACKED SPIRAL MODULAR PLASTIC CONVEYOR BELT SYSTEM

(75) Inventors: Eric K. Palmaer, Granite Bay, CA (US); John Kucharski, Sinking Spring, PA (US); William J. Bickel, Jr., Midwest City, OK (US)

(73) Assignee: KVP Falcon Plastic Belting, Inc., Reading, PA (US)

( * ) Notice: Subject to any disclaimer, the term of this patent is extended or adjusted under 35 U.S.C. 154(b) by 0 days.

(21) Appl. No.: 10/199,628

(22) Filed: Jul. 18, 2002

(65) Prior Publication Data

US 2004/0011627 A1 Jan. 22, 2004

(51) Int. Cl.[7] .............................................. B65G 21/18
(52) U.S. Cl. ...................................................... 198/778
(58) Field of Search ................................ 198/778, 779, 198/850, 853

(56) References Cited

U.S. PATENT DOCUMENTS

| 3,938,651 | A | * | 2/1976 | Alfred et al. ............... 198/778 |
| 4,858,750 | A | * | 8/1989 | Cawley ....................... 198/778 |
| 4,941,567 | A | * | 7/1990 | Olsson ........................ 198/778 |
| 4,955,465 | A | * | 9/1990 | Straight et al. ............. 198/778 |
| 5,350,056 | A | * | 9/1994 | Hager ......................... 198/778 |
| 5,460,260 | A | * | 10/1995 | Ochs et al. .................. 198/778 |
| 5,702,245 | A | * | 12/1997 | London ................... 198/778 X |
| 6,029,802 | A | * | 2/2000 | Musiari et al. ......... 198/779 X |
| 6,237,750 | B1 | * | 5/2001 | Damkjaer et al. ........... 198/775 |

* cited by examiner

Primary Examiner—James R. Bidwell
(74) Attorney, Agent, or Firm—Thomas M. Freiburger

(57) ABSTRACT

A modular plastic conveyor belt has upright support members at ends of each row and, in some cases, at intermediate positions, to support a conveyor tier above such that the belt is self-supporting in a helical stack in a spiral conveyor system. Modular rows can be made up of one or more modules, and the modules can be in various different configurations. The support members or spacer frames are either integral or securely connected to heavier link ends in end members of the modules. Preferably there are teeth and notches in the support frames and the bottom of the end member of the tier above, to hold the tiers of the helical stack in registry, preventing sliding and misalignment.

10 Claims, 9 Drawing Sheets

STACKED SPIRAL MODULAR PLASTIC CONVEYOR BELT SYSTEM

BACKGROUND AND SUMMARY OF THE INVENTION

The invention relates generally to a conveyor belt and system of the type that follows a helical path and in conventional practice is driven by a driving tower or cage, with the belt exiting one axial end of the helical path and being fed to the other axial end. The conveyor is usually known as a "spiral" conveyor system. The invention particularly concerns a modular plastic conveyor belt which articulates to accommodate straight and radius travel as applied to a helical conveyor belt, and to such a belt system wherein the belt is self-supporting and eliminates the need for a helical platform to support the stacked helically extending tiers of the belt, and also eliminates the driving tower. The invention also concerns side guards or side plates which can support successive tiers in such a spiral conveyor belt and which can be used in other helical plastic belts that are not self-supporting.

U.S. Pat. No. 3,938,651 discloses a self-supporting spiral conveyor belt system of a type which has been known, the conveyor belt being formed of metal links or rows which were capable of articulation to travel around the curving path of the helical conveyor belt system, as well as to travel in straight paths from the exit at one axial end of the helical conveyor to be fed back into the other axial end where the belt resumes helical travel. The belt was self-supporting in that it had metal spacers extending up from each side of each belt row, with upper portions of the spacers positioned to bear against the bottom of a link or row above, so that an overlying tier of the belt is supported by the immediately underlying tier. Thus, the metal belt of the referenced patent was arranged in a self-supporting helical stack without need for a support platform or wear strip under each tier and also without the need for a driving tower which normally would engage against inner edges of the belt rows or links to drive the belt up the helical path.

The helical conveyor belt of the '651 patent was not made up of integral modules but rather of rods and various metal components assembled together, with each spacer device being secured to several of the rods to retain it in position.

In the present invention a modular plastic conveyor belt is configured so as to be self-supporting, to be arranged in stacked helical tiers in a spiral conveyor belt system. The modules are integral and formed of injection molded plastic. Each module row may be one integral module or may be several integral modules assembled side by side on a common connecting rod. End members, at least at the edges of each row, preferably are larger as compared to inner ones of the series of interdigited projections of the belt modules, and these end members support plastic frames or side plates which extend upwardly from the end members and which include a generally horizontal bar providing a support surface for a generally similar end member immediately above in a succeeding tier of the belt.

The plastic frames preferably are generally shaped in an inverted "U" shape, and in a preferred embodiment the frames extend in an orientation which is somewhat close to parallel to the path of travel, but canted slightly. Alternate rows of modules, in one embodiment, have these frames at alternating positions and canted orientations, in an arrangement whereby the frames can be in overlapped juxtaposed position from module to module, whether at the collapsed inner edge of the helical belt travel or at the expanded outer edge of such a curving path. Further, the preferred belt construction includes a notch and tooth coactive between the top of each frame and the bottom of a belt end member immediately above, for engaging the two tiers together and retaining the belt in stacked relation both as to prevention of side-to-side sliding movement and advancing or retarding movement between tiers.

There are several important advantages of the integral plastic modular conveyor belt of the invention as a stacked tier, self-supporting helical conveyor. One important consideration is that the all-plastic belt eliminates metal contamination which is particularly important in food handling applications, a primary use of helical conveyors. Another advantage is the superior release characteristics of plastics, which improve throughput and reduce product damage and loss. Moreover, the lighter weight of plastic as opposed to a metal belt reduces installation time and helps in the support of the stacked helical tiers by considerably reducing the total weight of the helical stack.

In addition, the lower friction and higher fatigue resistance characteristics of plastic materials can improve belt life in the sometimes stressful travel path of a spiral conveyor. In the case of module rows each formed with a single module, the one-piece integral rows increase stiffness over assembled belts, thus better supporting a load in the absence of a supporting platform.

Still further, the injection molding of the modules allows for very intricate shapes and surface configurations to meet a variety of needs. Also, the modular plastic design allows the support members or frames to be placed at multiple locations across the width of the spiral belt, in order to provide adequate support in wider belt widths. Thus, if each row is made up of several modules, one or more of the interior module ends can include a support frame, to interact with a module end above, providing intermediate support between the edges of the belt.

The modular plastic spiral conveyor system in the self-supporting arrangement is also advantageous over metal in that it can be maintained with hand tools, and in the event of a catastrophic system jam in the spiral conveyor, a higher percentage of the plastic belt is salvageable.

The plastic frames also comprise side guards or side plates that retain products on the belt, and these form an important feature. They are open, allowing air circulation, and can be used effectively on non-self-supporting helical conveyor belts.

It is thus among the objects of the invention to provide for smooth and efficient belt movement in a helical or spiral conveyor belt system, with the belt formed of integral plastic modules with means for self-supporting the belt, with the tiers along the helical path being supported by the tier below. These and other objects, advantages and features of the invention will be apparent from the following description of a preferred embodiment, considered along with the accompanying drawings.

DESCRIPTION OF PREFERRED EMBODIMENTS

Figure 1:
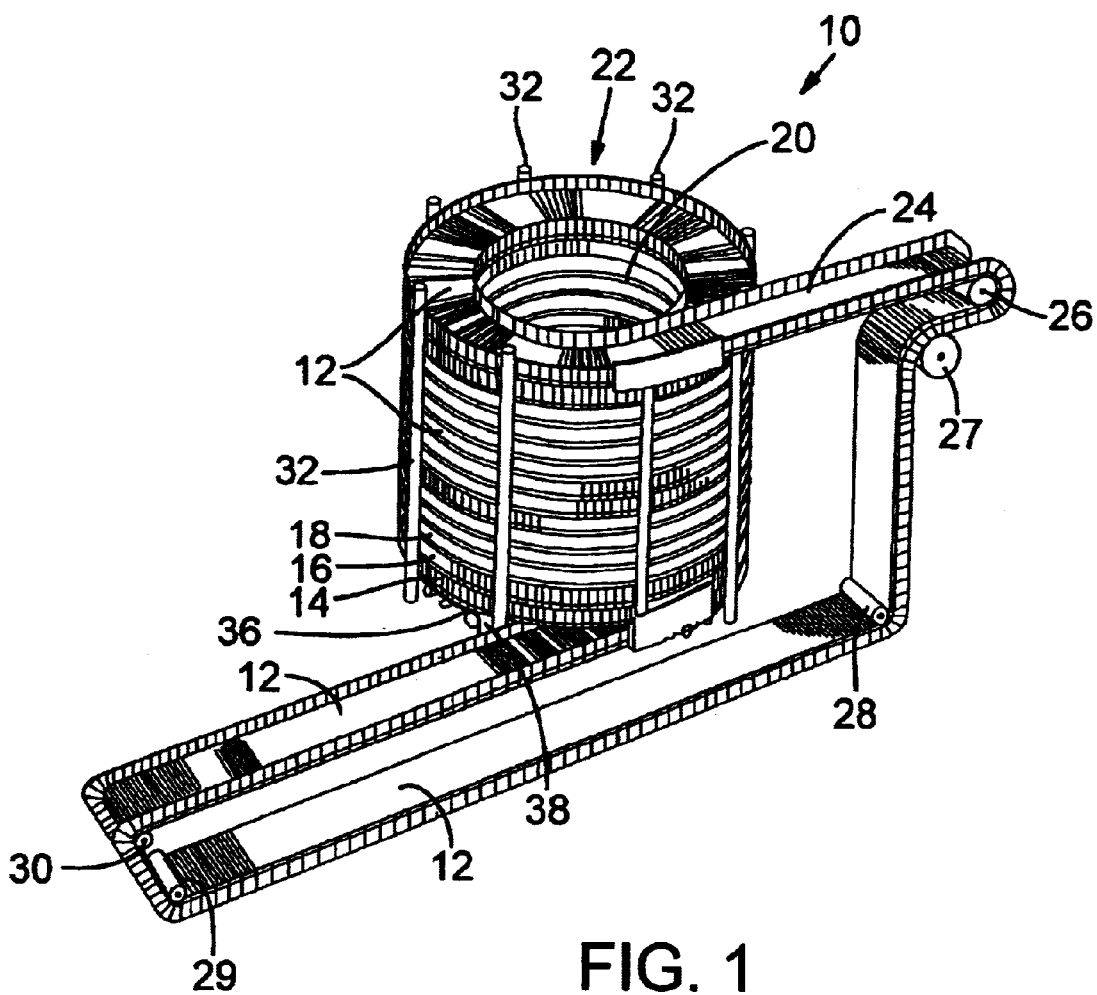
FIG. 1 is a schematic view showing a spiral or helical conveyor belt system in accordance with the invention.

FIG. 1 is a perspective view showing a helical or spiral conveyor belt system 10 which includes a conveyor belt 12 arranged in a stacked, helical configuration, with various tiers 14, 16, 18, etc. stacked serially and directly on one another, without the need for an intervening helically-shaped platform as is typical with conventional spiral conveyor belt systems. Thus, there is no need for a driving tower or cage which would ordinarily be within the center space 20 of the coiled conveyor belt stack 22.

As in other spiral conveyor belts, the belt 12 is normally fed into the helical, coiled stack 22 from the bottom, and makes its way through the various tiers and is fed out of the stack at the top, as indicated at 24 (although this could be reversed). There, the belt is fed around various rollers or drums 26, 27, 28, 29 and 30, one or more of which can have sprockets effective to drive the belt. Vertically extending, low-friction guides 32 can be included to retain the helically stacked belt in the helical arrangement as shown.

This arrangement is generally as shown in U.S. Pat. No. 3,938,651, describing a metal self-supporting spiral conveyor belt.

Also as in U.S. Pat. No. 3,938,651, a supporting base 36 comprising a separate conveyor belt having an inclined helical pattern with a step at 38 to accommodate the entry (or exit) of the conveyor belt from the stack preferably is provided. The helical stack 22 requires some form of rotation-allowing support at the bottom of the stack, which can be as in the '651 patent, incorporated herein by reference.

It should be understood that the rotation of the belt 12 in the helical stack 22 can be in either direction, clockwise or counterclockwise as seen from the top of the stack in FIG. 1.

Figure 2:
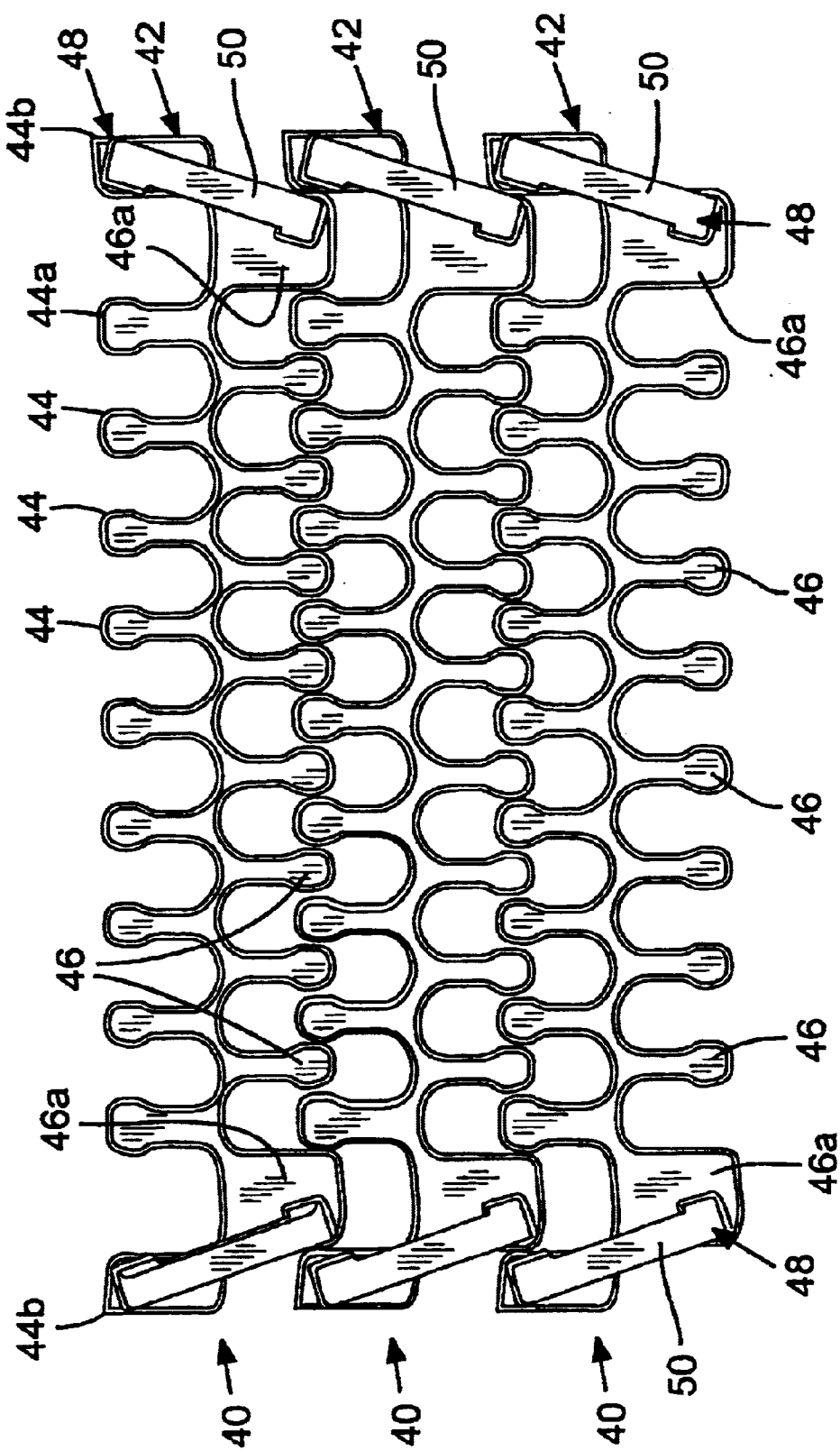
FIG. 2 is a plan view showing a portion of a plastic conveyor belt formed of integral modules and including the features of the invention.
Figure 3:
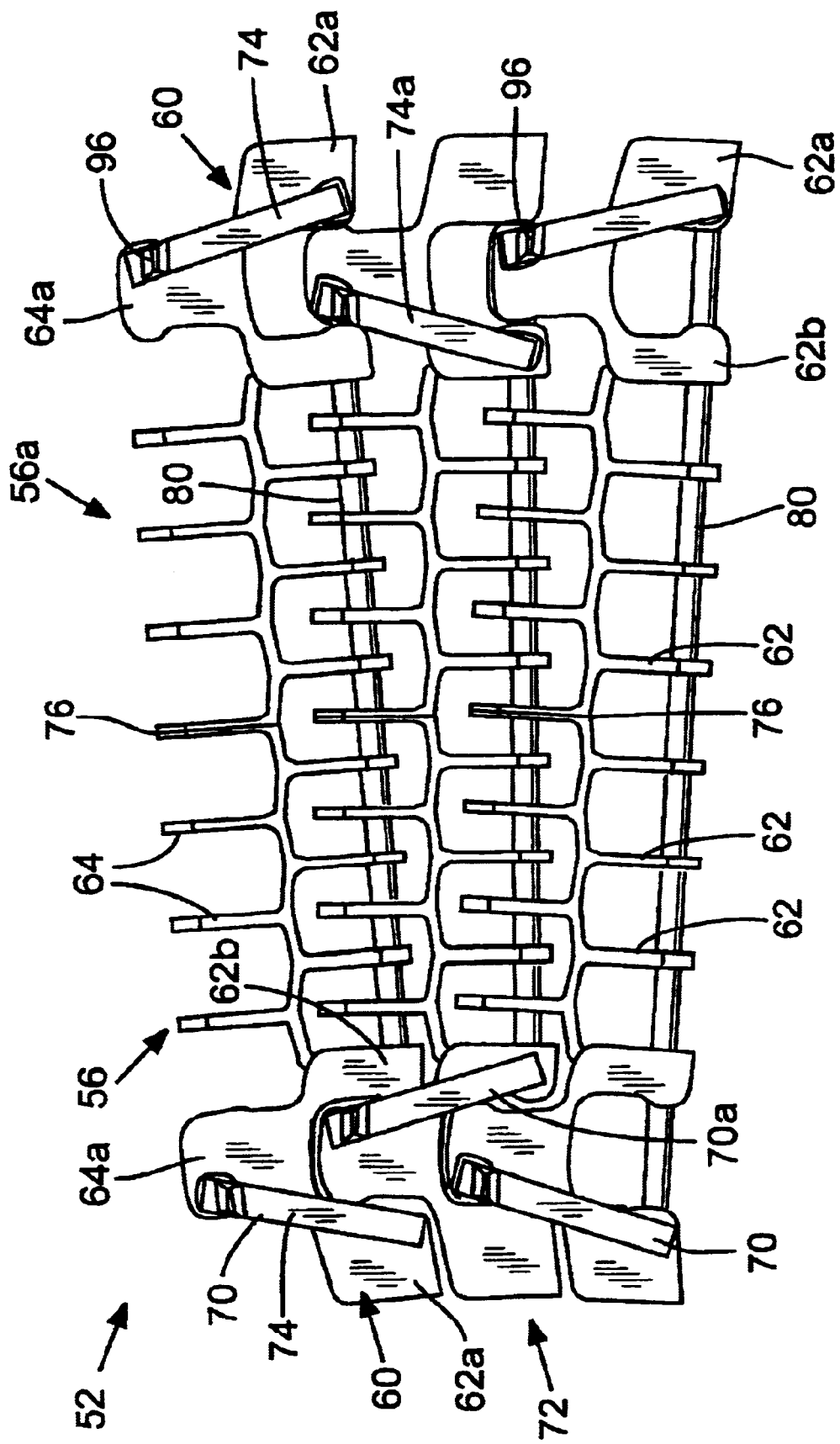
FIG. 3 is a plan view of a section of a different conveyor belt showing the belt section on a curve as in the helical conveyor, and with each conveyor row made up of several modules side by side.
Figure 4:
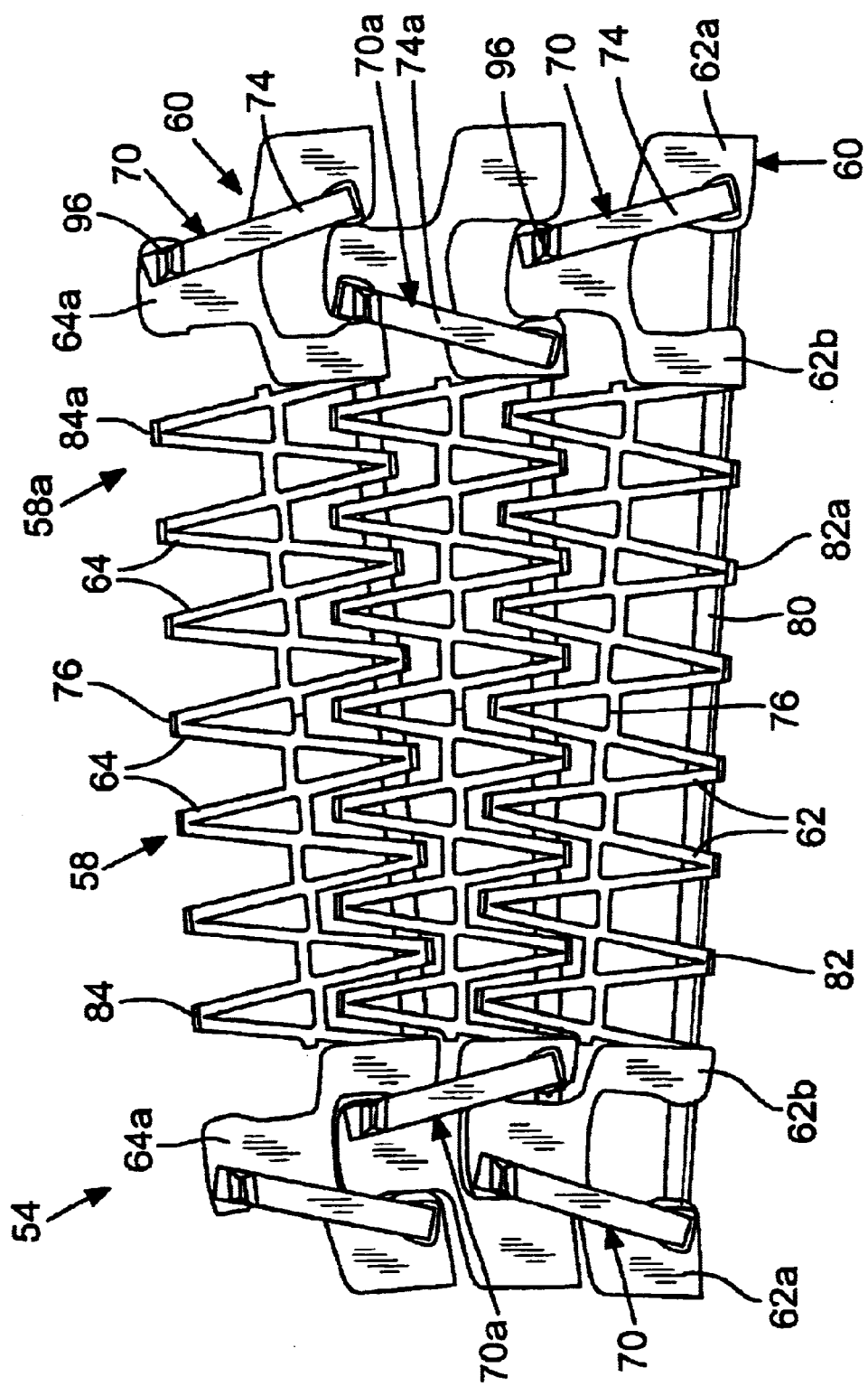
FIG. 4 is a view similar to FIG. 3 but showing a different style of plastic conveyor belt.

FIGS. 2, 3 and 4 show several different types of conveyor belt modules in multiple-row sections of belts, of types that can be used with the invention. In FIG. 2 and also FIG. 8, each module row 40 comprises a single, integral module 42. (A module row can be made up of a single module, several side-by-side modules, or a mix of multi-projection modules and single links, or all single links serving as modules. Single links can have one projection each direction, or tow in one direction and one in the other.) Each module 42 has a set of first projections or projecting link ends 44 and a second, oppositely-directed set of projecting link ends 46. These are interdigited in the normal way and connected together by connecting rods (not visible in FIGS. 2 and 8) which pass through apertures in the sets of link ends. One of the sets of projections is slotted, to accommodate curving belt travel. At left and right ends of the modules 42, the link ends are heavier, as at 44a, a somewhat heavier link end, and 44b, also a wider link end, and this situation occurs at both edges of the belt. Similarly, a much wider link end preferably occurs at the edges in the second group of projections 46, at 46a.

From these much wider link ends 46a extend a support member 48 or side plate at each edge of the belt. The support member 48 in a preferred embodiment is a generally U-shaped frame which is founded on the wide link end protection 46a and also on the edge link end 44b of the other set of projections of a module. These support members or spacer frames preferably are integrally molded with the conveyor belt modules, although they can be secured by a snap-in connection or screws or other fasteners, if it is desired to have them removable to provide a more versatile module or conveyor belt.

Figure 8:
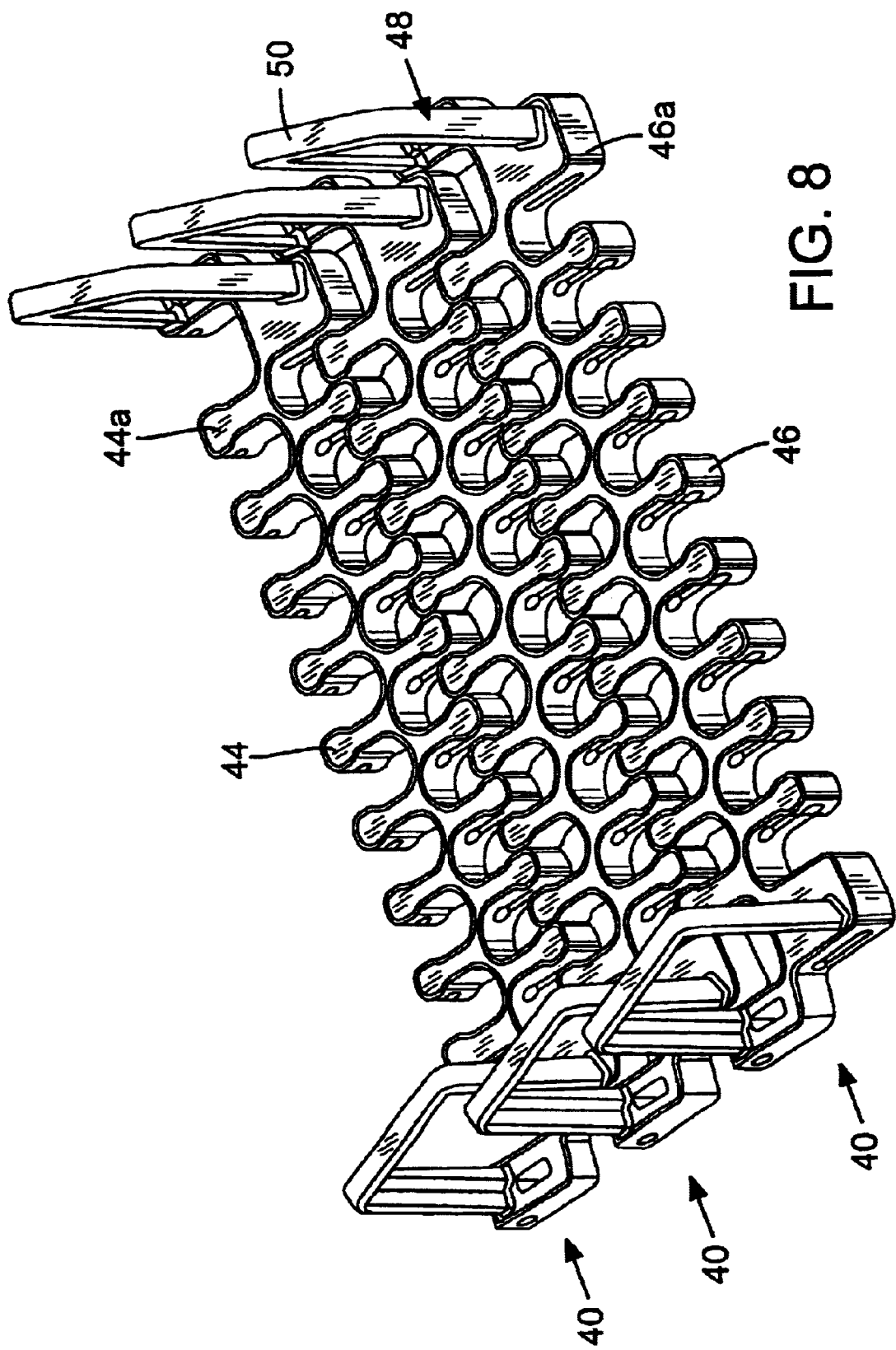
FIG. 8 is a perspective view showing the belt of FIG. 2.

In the belt section of FIGS. 2 and 8, the modules 42 (module rows 40) are arranged for straight travel, thus completely aligned and with the rods pulled to the back of the slotted projection holes (not shown). The support members or frames 48 are positioned at a canted, angular arrangement at the edges of the conveyor. This not only accommodates the staggered positioning of the module projections 46a and 44b, but also is necessary to allow the side plates or spacer frames 48 to slip alongside each other in overlapping relationship, to varying degrees. On a curve, the modules will collapse inwardly toward one another and nest closely at the inner edge of the belt. In this position, the spacer frames or support members 48 will become much more greatly overlapped, e.g. about 50%, than what is shown in the straight, aligned configuration in FIG. 2.

Each support member or spacer frame 48 preferably has a generally horizontal top bar 50 which, as will be shown below, serves to support the conveyor belt tier immediately above, engaging it against the bottom of similar module portions of the belt section above. The open frame allows all flow laterally through the belt tier.

FIGS. 3 and 4 show short belt sections 52 and 54 made up of somewhat different modules 56, 56a and 58, 58a. Both types of modules exhibit limited product contact, and maximize airflow through the belt. These belt modules have heavier end members, identified generally as 60. Again, these end members preferably are integrally molded with the remainder of each module, the modules including the first sets of projections 62 and second sets of projections 64, as shown. The second sets of projections have slotted openings, allowing the module rows to collapse together at the inside of a curve, shown at the left in both FIGS. 3 and 4.

The end members 60 each have thick second projections 64a as shown, and a similarly thick outer first projection 62a and also a heavy inner second projection 62b, the two second projections 62a and 62b forming a yoke shape with the fat first projection 64a as shown. As the drawings illustrate, the end members 60 on opposite sides of the module rows preferably are opposite-hand in configuration.

Each of the end members 60 has a support member 70, preferably extending integrally upwardly by common molding with the end member as a single piece of material but which can be connected by snap-in fasteners, etc., or which could be permanently secured by adhesion or sonic bonding. The side plates or spacer frames 70 are generally similar to the support frames 48 seen in FIG. 2, and in this embodiment, alternate rows of these support members 70 are canted in the same direction, as FIGS. 3 and 4 show. In the embodiment shown, the other alternate module rows, such as the row 72 in FIG. 3, have a substantially similar support frame or side plate 70a which is canted in the opposite direction. This provides support for the belt tier above at alternate locations from row to row, adding greater support with the staggered and spaced arrangement, while also affording more space between the spacer frames 70 in the collapsed configuration shown on the left in FIG. 3. In this configuration the frames are generally about 50% overlapped, as illustrated; if all frames were canted in the same direction, this back flexing could be hindered. The advantage of the FIG. 2 arrangement is in providing greater product support area than FIGS. 3 and 4.

Each of the support members or spacer frames 70, 70a has a top bar 74, 74a which is generally horizontal, i.e. parallel to the approximate plane of the belt in the surrounding area.

FIGS. 3 and 4 show two modules making up each module row. The dividing line between modules is seen at 76. In this case, the connecting rods 80 between rows are sufficiently strong to support the module row across the span between the end members 60, since the module rows are freely suspended between these ends, as supported on the horizontal bars 74 of the spacer members 70, 70a. Metal rods can be used if needed. Also, alternate module rows can comprise a single module, this alternating with the split rows and adding strength. However, it should be understood that another heavy member such as the end member 60 can be positioned at or adjacent to the split line 76 between the modules in a row. Such an end member can form a second end of one of the modules, and the end member will then have support member or spacer frame so as to support the tier above from such an approximate midpoint, shortening the unsupported span of belt.

The FIG. 4 belt is similar functionally to the FIG. 3 belt, but with V-shaped or A-shaped link end structures. Thus, the set of first link ends in the modules 58, 58a in FIG. 4 are identified as 82, 82a, and the second set of link ends are identified as 84, 84a. These types of link ends are well known in plastic belts.

Figure 5:
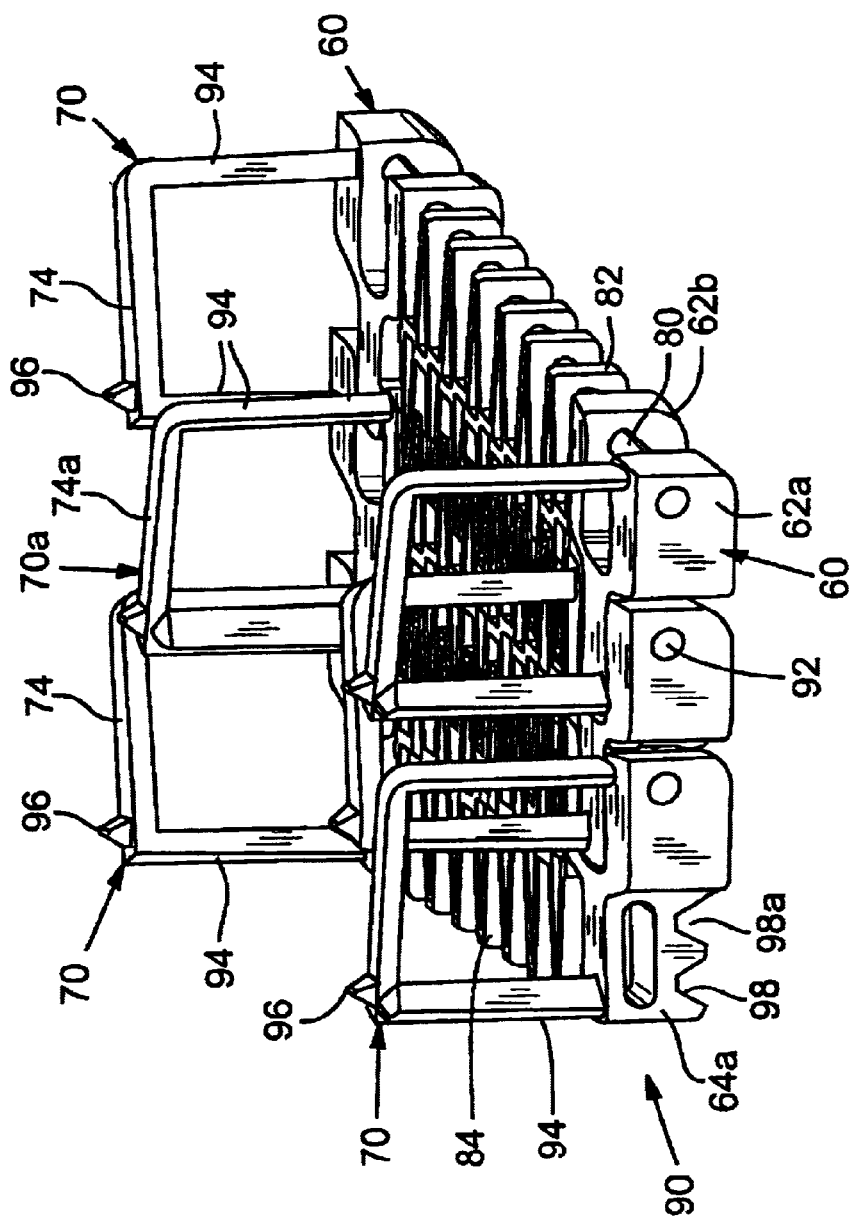
FIG. 5 is a perspective view showing several module rows of a conveyor belt, traveling in a radius path, with features of the invention.

FIG. 5 shows a section of a belt 90 which may be similar to that of FIG. 4, with the nearer belt edge shown collapsed as on the inside of a curve. The belt 90 has module end members 60 similar to those shown in FIGS. 3 and 4, preferably integral with module structure including link end projections 82, 84 as in FIG. 4. The link ends 82 and 84 may be in a single module extending from end member 60 to end member 60, or these can comprise parts of several modules assembled together side by side on the connecting rods 80. FIG. 5 illustrates the arrangement of the support members or spacer frames 70, 70a in this type of stackable spiral conveyor belt. The spacer frames 70, 70a are shown as having vertical legs 94 which are triangular-shaped in cross section, and the top bars 74, 74a may also be formed in this same cross section. This shape helps maximize air flow while providing the needed strength, but other cross sections can be used if desired. As also shown in FIG. 5, the top bars 74 have upwardly protruding nipples or teeth 96 (also seen in FIGS. 3 and 4), which may be triangularly shaped as shown, preferably aligned in an orientation perpendicular to the direction of travel, for engaging in notches 98, 98a in the bottoms of the projections 64a on the end members 60 supported on these frames 70 directly above. The notches 98 provide a forward/back locating function and also a lateral locating function by engagement with the nipples or teeth 96. The width of these notches is limited to the width of the projections 64a, and in the assembled conveyor belt the teeth cannot move laterally beyond the width of the projection 64a because of the immediately adjacent projections 62a and 62b of the end member of the assembled adjacent module row. The reason two notches 98, 98a are provided, at tandem locations as shown, is to facilitate easier placement on the belt's support platform and engagement between tiers; each tooth 96 will engage with one or the other of the two notches above.

Figure 6:
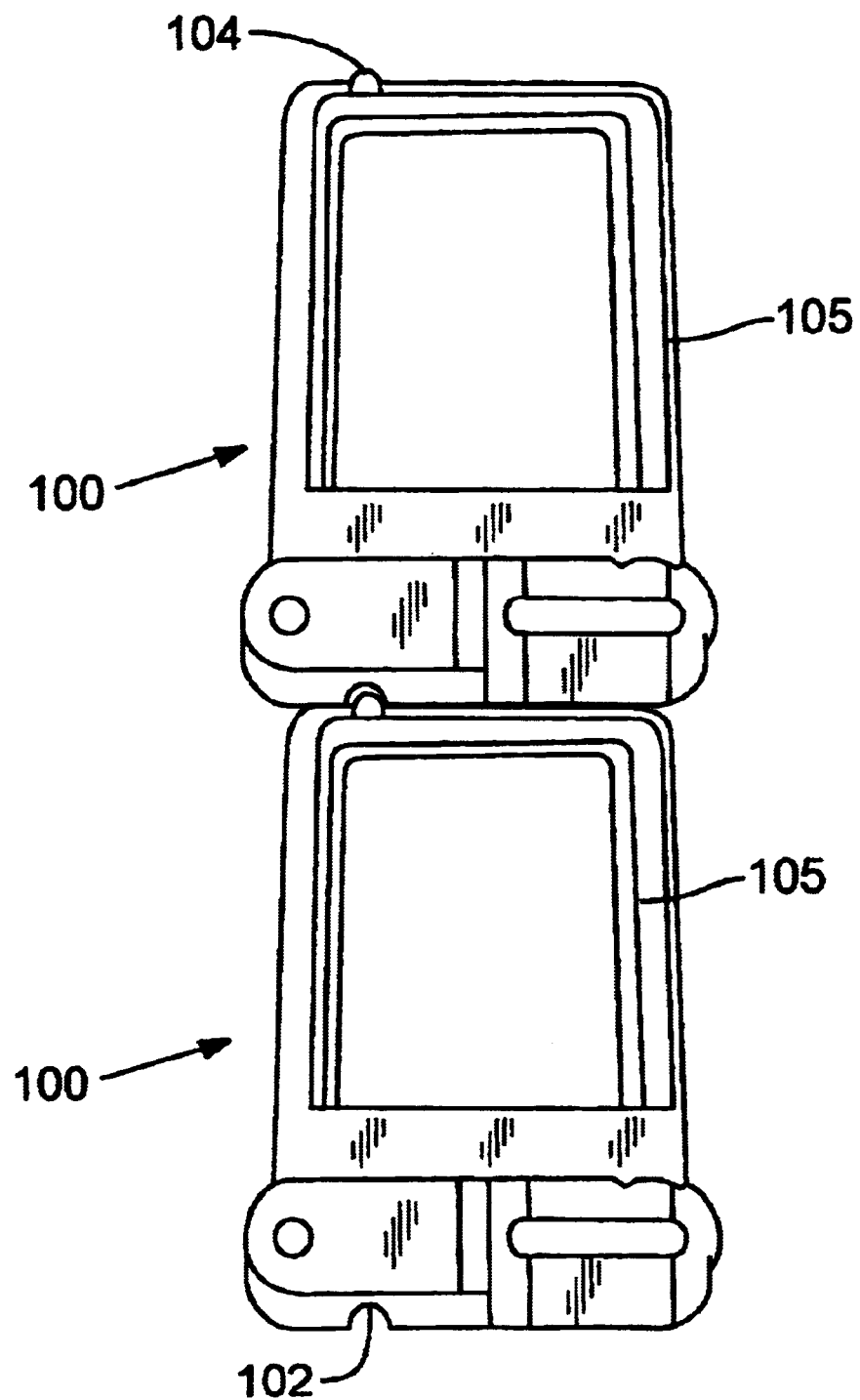
FIG. 6 is a side or edge view showing two stacked module rows of a conveyor belt according to the invention.
Figure 7:
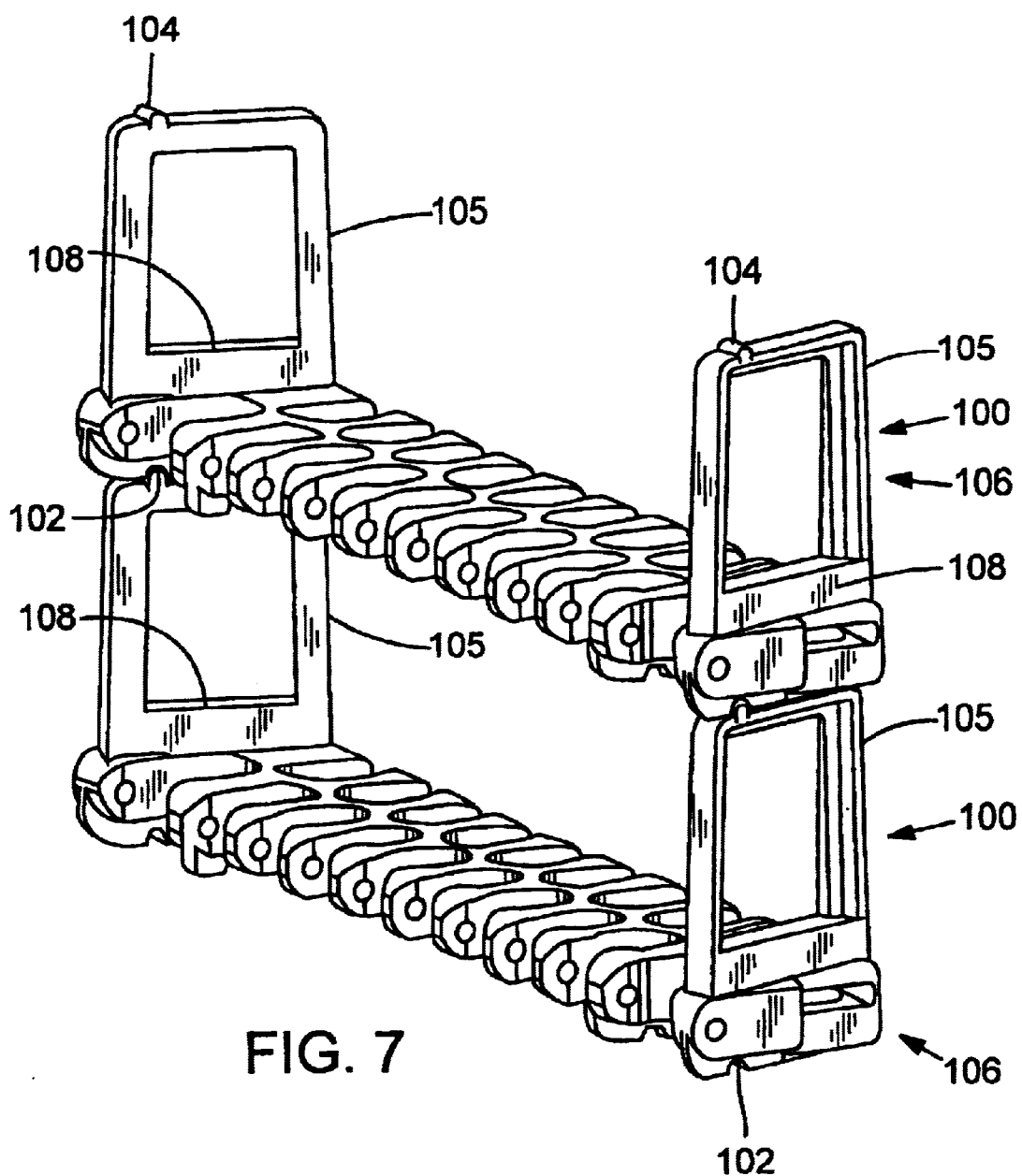
FIG. 7 is a perspective view showing stacked module rows according to the embodiment of FIG. 6.

FIG. 6 shows two stacked modules 100 of a slightly modified form of the invention. The groove or notch 102 is in the first set of projections, engageable with a nipple or tooth 104 or a spacer frame 105 of a module below as shown. FIG. 7 shows this embodiment in perspective, schematically indicating module rows 106 from two successive tiers of the belt. The illustrated spacer frames 105 are shown somewhat heavier than the frames 70 in other embodiments, formed as complete rectangles including a bottom beam 108. Again, these can be integrally molded with the modules or they can be arranged to snap in or can be secured by adhesive, solvent bonding or fasteners.

FIG. 8 is a perspective view from above, showing the conveyor belt of FIG. 2.

Figure 9:
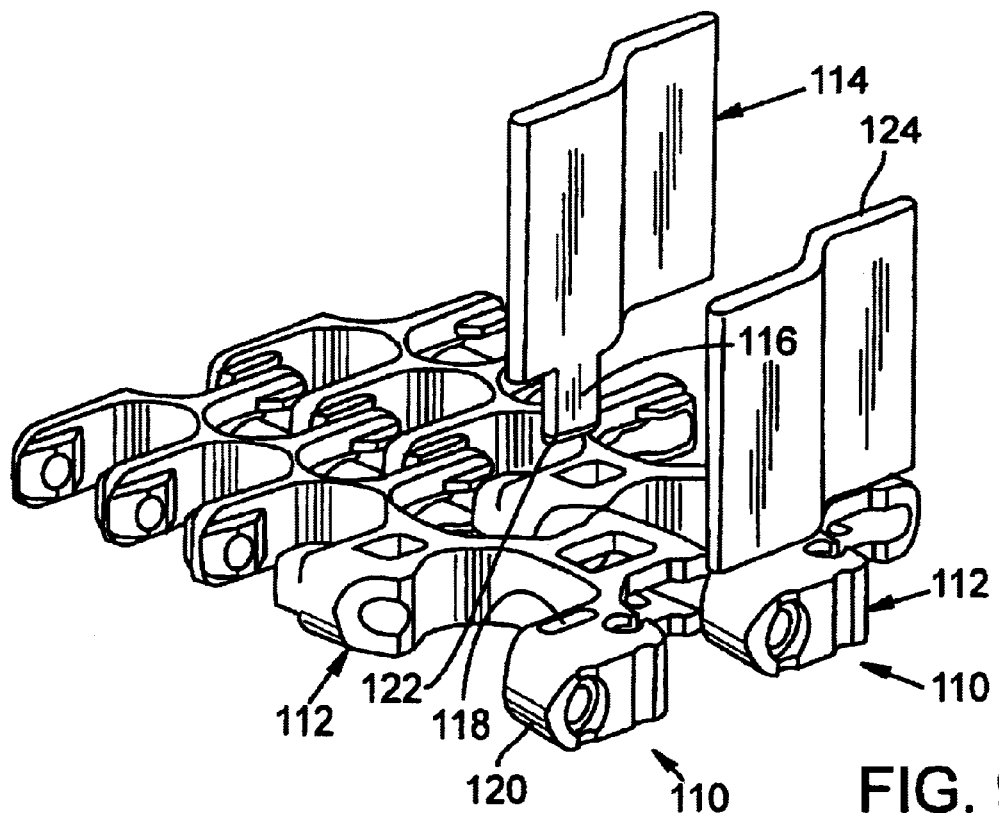
FIGS. 9 and 10 are perspective views showing another embodiment of a stacking spiral conveyor belt, with solid stacking side plates.
Figure 10:
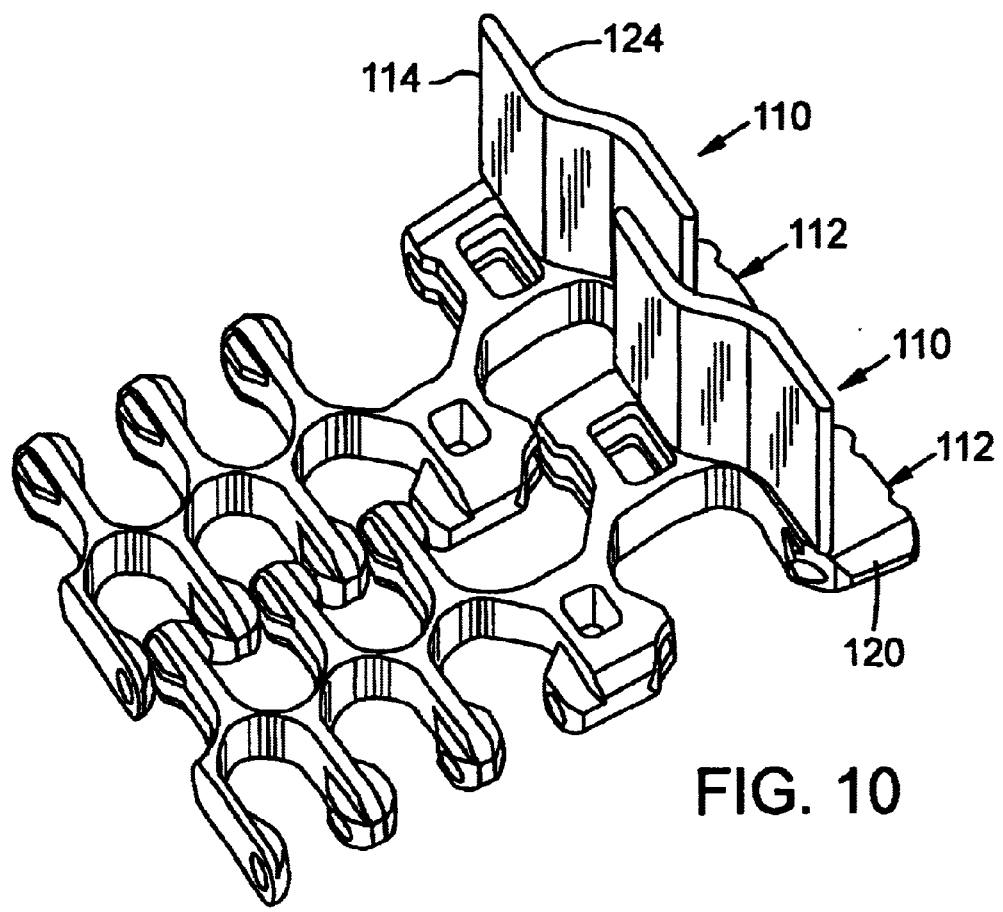

FIGS. 9 and 10 show another embodiment of a radius type conveyor belt, which may be used on spiral conveyors, with module rows 110 each including module end members 112 having solid stacking side plates 114 that can be assembled into the modules. In this embodiment, each solid side plate 114 is generally S-shaped as shown, and with at least one tab 116 insertable into a slot 118 included in a wide projection 120 in the module end member 112. This is preferably a tight snap-in connection, and the side plate 116 can have a rubbery foot piece 122 (connected to the end member by comolding, mechanical connection or adhesion), to help assure a close and stable fit. The bottoms of the end members 112 can have appropriate structure for seating the top edges 124 of these stacking side plates, to assure lateral stability of the stacked spiral conveyor belt. This type spacer frame, in addition to its removability, has the added advantage of providing an essentially solid barrier at the edge of the belt to retain small products on the belt, acting as a side guard or side plate (the side plates need not be totally solid, but can have openings).

The earlier-described frames also act as side guards, and are open for air circulation. Not limited to self-supporting spiral belts, these side guards are effective on non-self-supporting spiral belts (riding on a helical platform), wherein air circulation from the sides of the helical belt is important. The open frames can have additional product-retaining structure for smaller products if needed, partially closing the rectangular opening shown while still allowing adequate air circulation.

The open side guards can also be used on non-spiral radius type conveyor belts that articulate to travel around curves.

Broadly, the belt of the invention can be formed of modules connected by rods or otherwise, as by interconnected projections from module to module. Also, the support members or side plates can extend upwardly or downwardly or, if desired they could extend both upwardly and downwardly and engage one another between tiers. Still further, the location of the supports, though preferably on end members of modules as shown in the drawings, could be inboard somewhat and can include intermediate supports between the ends, so long as stable support is provided between tiers.

The conveyor belt of the invention may be injection molded from any of several different plastic materials: for example, polyethylene, polypropylene and actual. Actual tends to be best for freezer conveyors.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A side guard for attachment to a module of a modular plastic conveyor belt, comprising:

a plastic frame having a top portion and spaced apart legs connected to the top portion and extending downwardly, each leg having a bottom end with means for connection to an upper surface of a modular plastic conveyor belt, such that the side guard extends upwardly from the module, defining an open space within the frame for air circulation, and wherein the two legs of the plastic frame have downwardly extending tabs configured to fit closely into recesses or slots in the upper surface of the plastic conveyor belt module, serving as said means for connection.

2. The side guard of claim 1, wherein the top portion of the plastic frame extends generally horizontally, with the two legs extending generally vertically down from the top portion.

3. A helical conveyor belt system with a modular plastic conveyor belt, comprising:

an endless modular plastic conveyor belt having opposed top and bottom surfaces and capable of straight and radius travel, arranged in a generally helical stack such that one course or tier of the conveyor belt rests on a course or tier directly below, and a bottom tier resting on a rotation supporting means, the conveyor belt configured to extend tangentially into and out of the generally helical stack at bottom and top of the stack, the belt departing from the stack at one axial end of the stack, with a belt return path separate from the generally helical stack including rollers arranged to engage the belt and feed it in a return path back to the generally helical stack at an opposite axial end from the position at which the belt departed from the stack, said plastic conveyor belt being assembled from a series of plastic belt modules in a series of module rows, with adjacent belt modules being interconnected via interdigited projections of the adjacent modules, at least some of the modules having support members which extend vertically a predetermined distance from at least one of said surfaces of the belt, and positioned to maintain a predetermined vertical separation with an immediately adjacent course or tier so as to support the several tiers in stacked generally helical relationship and with said surfaces of adjacent tiers spaced from one another suitably to convey products thereon, between the tiers, wherein each module row has end members at its ends, and wherein the support members extend from the end members, and wherein at least some of the module rows comprise a plurality of modules assembled side-by-side to form the row, and wherein the rows having a plurality of modules include support members extending vertically at intermediate locations between left and right edges of the module row, so as to provide support for the helical stack at intermediate positions between the two edges of the stacked conveyor belt.

4. A helical conveyor belt system with a modular plastic conveyor belt, comprising:

a series of interdigited plastic belt modules, each module having first and second sets of spaced projections, the first and second sets of projections extending in opposite directions longitudal with respect to belt travel, with laterally extending apertures through the projections, the apertures of each set of projections being aligned, and the modules being positioned in rows, with first projections of one module row being interdigited with second projections of an adjacent module row, and with connecting rods extending through apertures of the interdigited projections so as to connect succeeding module rows, a series of side guards extending upwardly from an edge of the belt, the modules at said edge having end members, and the side guards comprising open plastic frames extending upwardly from the end members, each plastic frame having a top portion and a pair of legs extending up from said end member to the top portion, forming an open space defined by the two legs, the top portion and the end member of the module, and wherein the plastic frames are each arranged in planes essentially perpendicular to the conveyor belt surface, with the planes of the plastic frames being canted at an oblique angle relative to the direction of travel of the conveyor belt, the canted plastic frames of succeeding module rows being so oriented as to allow extension or retraction of the edges of the module rows for radius travel or for straight travel in the helical conveyor belt system.

5. A helical conveyor belt system with a modular plastic conveyor belt, comprising:

an endless modular plastic conveyor belt having opposed top and bottom surfaces and capable of straight and radius travel, arranged in a generally helical stack such that one course or tier of the conveyor belt rests on a course or tier directly below, and a bottom tier resting on a rotation supporting means, the conveyor belt configured to extend tangentially into and out of the generally helical stack at bottom and top of the stack, the belt departing from the stack at one axial end of the stack, with a belt return path separate from the generally helical stack including rollers arranged to engage the belt and feed it in a return path back to the generally helical stack at an opposite axial end from the position at which the belt departed from the stack, said plastic conveyor belt being assembled from a series of plastic belt modules in a series of module rows, with adjacent belt modules being interconnected via interdigited projections of the adjacent modules, at least some of the modules having support members which extend vertically a predetermined distance from at least one of said surfaces of the belt, and positioned to maintain a predetermined vertical separation with an immediately adjacent course or tier so as to support the several tiers in stacked generally helical relationship and with said surfaces of adjacent tiers spaced from one another suitably to convey products thereon, between the tiers, wherein each module row has end members at its ends, and wherein the support members extend from the end members, wherein the support members comprise plastic frames extending upwardly from said end members, each plastic frame having a generally horizontal top bar positioned to support a similar end member of a module immediately above, and wherein the generally horizontal bars alternate in position from module row to module row and the frames being positioned to overlap in length at both the inside of a curve and the outside of a curve in the helical conveyor belt system.

6. The plastic conveyor belt system of claim 5, wherein the plastic frames are each arranged in planes essentially perpendicular to the conveyor belt surface, with the planes of the plastic frames being canted at an oblique angle relative to a path of travel of the conveyor belt, and with the plastic frames of alternate belt rows being canted in opposite oblique directions from the path of travel, with spacing of alternate-row plastic frames adequate to allow collapse together of the module rows at the inner edge of curves in the helical conveyor belt.

7. A helical conveyor belt system with a modular plastic conveyor belt, comprising:

an endless modular plastic conveyor belt having opposed top and bottom surfaces and capable of straight and radius travel, arranged in a generally helical stack such that one course or tier of the conveyor belt rests on a course or tier directly below, and a bottom tier resting on a rotation supporting means, the conveyor belt configured to extend tangentially into and out of the generally helical stack at bottom and top of the stack, the belt departing from the stack at one axial end of the stack, with a belt return path separate from the generally helical stack including rollers arranged to engage the belt and feed it in a return path back to the generally helical stack at an opposite axial end from the position at which the belt departed from the stack, said plastic conveyor belt being assembled from a series of plastic belt modules in a series of module rows, with adjacent belt modules being interconnected via inter-digited projections of the adjacent modules, at least some of the modules having support members which extend vertically a predetermined distance from at least one of said surfaces of the belt, and positioned to maintain a predetermined vertical separation with an immediately adjacent course or tier so as to support the several tiers in stacked generally helical relationship and with said surfaces of adjacent tiers spaced from one another suitably to convey products thereon, between the tiers, wherein each module row has end members at its ends, and wherein the support members extend from the end members, wherein the support members comprise plastic frames extending upwardly from said end members, each plastic frame having a generally horizontal top bar positioned to support a similar end member of a module immediately above, and wherein at least some of the horizontal bars of the plastic frames have a tooth extending upwardly, and the end member immediately above having a notch positioned to receive the tooth, the teeth and notches being arranged to retain the stacked tiers of modules in alignment.

8. A helical conveyor belt system with a modular plastic conveyor belt, comprising:

an endless modular plastic conveyor belt having opposed too and bottom surfaces and capable of straight and radius travel, arranged in a generally helical stack such that one course or tier of the conveyor belt rests on a course or tier directly below, and a bottom tier resting on a rotation supporting means, the conveyor belt configured to extend tangentially into and out of the generally helical stack at bottom and top of the stack, the belt departing from the stack at one axial end of the stack, with a belt return path separate from the generally helical stack including rollers arranged to engage the belt and feed it in a return path back to the generally helical stack at an opposite axial end from the position at which the belt departed from the stack, said plastic conveyor belt being assembled from a series of plastic belt modules in a series of module rows, with adjacent belt modules being interconnected via inter-digited projections of the adjacent modules, at least some of the modules having support members which extend vertically a predetermined distance from at least one of said surfaces of the belt, and positioned to maintain a predetermined vertical separation with an immediately adjacent course or tier so as to support the several tiers in stacked generally helical relationship and with said surfaces of adjacent tiers spaced from one another suitably to convey products thereon, between the tiers, wherein each module row has end members at its ends, and wherein the support members extend from the end members, and wherein the support members are removably secured to the end members of the belt module rows, the support members including downwardly extending tabs which fit closely in corresponding recesses or slots of the end members.

9. A helical conveyor belt system with a modular plastic conveyor belt, comprising:

an endless modular plastic conveyor belt having opposed top and bottom surfaces and capable of straight and radius travel, arranged in a generally helical stack such that one course or tier of the conveyor belt rests on a course or tier directly below, and a bottom tier resting on a rotation supporting means, the conveyor belt configured to extend tangentially into and out of the generally helical stack at bottom and top of the stack, the belt departing from the stack at one axial end of the stack, with a belt return path separate from the generally helical stack including rollers arranged to engage the belt and feed it in a return path back to the generally helical stack at an opposite axial end from the position at which the belt departed from the stack, and said plastic conveyor belt being assembled from a series of plastic belt modules in a series of module rows, with adjacent belt modules being interconnected via inter-digited projections of the adjacent modules, at least some of the modules having support members which extend vertically a predetermined distance from at least one of said surfaces of the belt, and positioned to maintain a predetermined vertical separation with an immediately adjacent course or tier so as to support the several tiers in stacked generally helical relationship and with said surfaces of adjacent tiers spaced from one another suitably to convey conducts thereon, between the tiers, wherein the support members comprise essentially solid side plates extending from the surface of the belt, the side plates extending upwardly and providing a barrier at the edges of the conveyor belt, and wherein the essentially solid side plate has a downwardly extending tab and the belt module has a recess or slot positioned to closely receive the tab, for removably securing the side plates to the module.

10. A helical conveyor belt system with a modular plastic conveyor belt, comprising:

a series of interdigited plastic belt modules, each module having first and second sets of spaced projections, the first and second sets of projections extending in opposite directions longitudal with respect to belt travel, with laterally extending apertures through the projections, the apertures of each set of projections being aligned, and the modules being positioned in rows, with first projections of one module row being interdigited with second projections of an adjacent module row, and with connecting rods extending through apertures of the interdigited projections so as to connect succeeding module rows, a series of side guards extending upwardly from an edge of the belt, the modules at said edge having end members, and the side guards comprising open plastic frames extending upwardly from the end members, each plastic frame having a top portion and a pair of legs extending up from said end member to the top portion, forming an open space defined by the two legs, the top portion and the end member of the module, and wherein the side guards are removable from the plastic conveyor belt modules, the legs of each plastic frame having downwardly extending tabs, and the end member of at least some of the modules having recesses or slots extending down into the end member and positioned to closely receive the tabs of the legs, for removably securing the side guards to the module end members.

\* \* \* \* \*